United States Patent Office 3,642,681
Patented Feb. 15, 1972

3,642,681
POLYSILICIC ACID COATING COMPOSITION
Matthew Edward Hermes, Wilmington, Del., assignor to E. I. du Pont de Nemours and Company, Wilmington, Del.
No Drawing. Filed Jan. 14, 1969, Ser. No. 791,170
Int. Cl. B44d 1/24; C08g 31/32, 47/08
U.S. Cl. 260—29.6                                   8 Claims

ABSTRACT OF THE DISCLOSURE

A coating composition especially useful to render polymethyl methacrylate mar resistant. Said composition contains polysilicic acid, a silane containing ester in which at least two radicals attached to the silicon atom are $OR^4$, where $R^4$ is 1 to 6 carbon atoms, and sufficient water to hydrolyze some of the groups on the silane containing ester. The coating composition also preferably contains an organic acid.

---

This invention relates to a coating composition especially useful to render substrates mar resistant.

It is known in the art to apply various coating compositions to plastic substrates such as polymethyl methacrylate in an effort to increase their mar resistance. See U.S. Pats. 2,404,357, 2,404,426, and 2,440,711. The present coating composition is for a similar purpose.

The present coating composition has an advantage over those known in the art in that it is made of commercially available ingredients that are combined in a relatively simple procedure, thus giving an overall economic advantage to these compositions. Substrates coated with these compositions perform very satisfactorily in indoor service. The coatings are transparent, hydrolytically stable, transmit light well, and have no haze.

The coating composition of the present invention is made by combining polysilicic acid, produced by the hydrolysis of a tetra alkyl orthosilicate, such as tetra ethyl, tetra methyl, tetra propyl, or tetra isobutyl orthosilicate, with a silane containing ester having the formula:

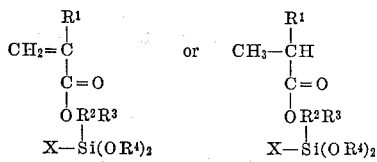

where $R^1$ is hydrogen or methyl, $R^2$ is an alkylene group having 1 to 6 carbon atoms, $R^3$ is hydrogen or an alkyl group having 1 to 5 carbon atoms, the sum of the carbon atoms in $R^2$ and $R^3$ being not more than 6, $R^4$ is an alkyl group of 1 to 6 carbon atoms and X is hydrogen or $-OR^4$, or alkyl of 1 to 6 carbon atoms.

The coating composition preferably contains an organic acid selected from the group consisting of formic acid, acetic acid and propionic acid. The acid assures adhesion of the coating composition to polymethyl methacrylate substrates.

The coating must contain sufficient water to at least partially hydrolyze the silicon ester portion of the silane containing ester. The water may be added as an excess ingredient from hydrolysis of the tetra alkyl orthosilicate, or added as a separate item to the coating solution. To obtain the optimum coating composition the water should be present in an amount sufficient to hydrolyze at least some, and preferably all, of the hydrolyzable groups on the silicon ester portion of the silane containing ester, i.e., water should be present in excess of 2 moles per each mole of silane containing ester present.

A suitable solvent for the coating solution is a lower aliphatic alcohol, such as one having 1 to 8 carbon atoms.

The polysilicic acid and the silane ester are believed to form a complex. These two ingredients are usually added in amount such that the solution contains between about 2 and 40 weight percent of complex forming ingredients. The ratio of polysilicic acid to silane ester is preferably in the range of 1:10 to 1:1.

The organic acid affects the surface of the substrate in such a manner that the coating adheres firmly to the substrate. The organic acid is usually present in the coating solution to the extent of between about 10 and 75 parts by weight of the solution, preferably about 50.

The lower alcohol is the solvent for the other of the components of the coating composition. Because of its relatively high volatility, the alcohol is evaporated during the curing steps. The alcohol usually comprises about 5 to about 35 percent of the total weight of the coating composition.

The coating composition may be applied to the substrate by the methods known in the art such as by spraying, dipping, and brush painting. After application of the coating to the substrate, it is necessary to cure the coating. The curing is accomplished by heating the coating to a temperature in the range of about 100° C. to 180° C. for from 30 minutes to 5 hours. The temperature need not remain constant during the curing, and may be periodically increased or decreased as desired. The curing can be accomplished in an electric oven in which the air is circulated.

The coating composition has particular utility in coating polymethyl methacrylate containing surfaces. The surfaces need not be only polymethyl methacrylate, but could also contain other acrylate polymers and copolymers. The coatings not only adhere tightly to the surface of polymethyl methacrylate and increase its abrasion resistance, but in addition are optically clear, are very low in haze and are not changed by most household cleaners.

The coating composition may also contain various other additives, which can in some instances further enhance the properties of the coating, for example, pigments, and catalysts such as alpha,alpha azo-bis-isobutyronitrile may be added.

Preferably, the coating composition contains a silicone leveling agent. Such materials are known in the art to be block copolymers of lower alkylene oxides and a lower dialkyl siloxane (see U.S. Pat. 3,172,899), and their use is described in coating compositions in Engelhardt U.S. patent application S.N. 464,184, filed June 15, 1965 now U.S. 3,476,827. One such material sold by Union Carbide Corporation is "L-520," which is a polymer of dimethyl siloxane grafted with polyethylene oxide and polypropylene oxide.

In the following examples which illustrate the inventions, all parts and percentages are in parts by weight unless otherwise noted.

EXAMPLE I

A coating composition was made by hydrolyzing 100 parts of ethyl orthosilicate with 47 parts of ethanol and 45 parts 0.1 N hydrochloric acid. The product was allowed to stand two days at room temperature, and then 120 parts of the product were mixed with 30 parts of 3 trimethoxysilylpropyl methacrylate and allowed to stand for 15 minutes. Then 0.04 part of alpha, alpha azo-bis-isobutyronitrile and 0.02 part of "L-520" were added. 150 parts of glacial acetic were added.

The solution was pooled on a panel of polymethyl methacrylate, air dried and heated for 30 minutes at 90° C. The coating had excellent adhesion but no additional scratch resistance.

The solution was pooled on a second panel of polymethyl methacrylate, air dried, and heated for 60 minutes at 150° C. The coating had 100% adhesion and excellent scratch resistance. (Adhesion was measured by scratching a grid pattern through the surface, and then applying a piece of "Scotch" cellophane tape and stripping the tape manually as rapidly as possible at a 90° angle to the coated surface. The adherence is rated 0 to 100%. This test is described in U.S. Pat. 3,304,196. Scratch resistance is measured by rubbing the coated surface with #0000 steel wool at about 15 p.s.i. pressure. If the coating mars as readily as uncoated polymethyl methacrylate, it is rated poor; if it is difficult or impossible to mar, it is rated excellent.)

EXAMPLE II

A coating solution was made in the same manner as Example I, except that no alpha, alpha azo-bis-isobutyronitrile was added. Panels coated with the solution were cured for 30 minutes at 95° C., then the temperature was increased over a 30 minutes period up to 150° C., and finally, the temperature was kept at 150° C. for 60 minutes. The coatings had excellent abrasion resistance and adhesion.

EXAMPLE III

A coating solution was made in the same manner as Example II, except that no "L-520" was added. The coatings made from this solution had the same adherence and abrasion resistance as the coatings of Examples I and II.

I claim:
1. A coating composition comprising a solution of lower aliphatic alcohol solvent, water, and 2 to 40% by weight of the reaction product of polysilicic acid and a hydrolysis product of a silane containing ester having the formula:

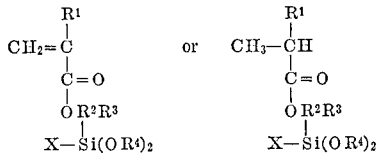

where $R^1$ is hydrogen or methyl, $R^2$ is an alkylene group having 1 to 6 carbon atoms, $R^3$ is hydrogen or an alkyl group having from 1 to 5 carbons, the sum of the carbon atoms in $R^2$ and $R^3$ being not more than 6, $R^4$ is an alkyl group of 1 to 6 carbon atoms, and X is selected from the group consisting of hydrogen, $OR^4$, and alkyl of 1 to 6 carbon atoms.

2. The coating composition of claim 1 also containing an organic acid selected from the group consisting of formic, acetic and propionic acid.

3. The coating composition of claim 2 also containing a silicone leveling agent.

4. The coating composition of claim 2 in which the organic acid is present in the coating composition to the extent of between about 10 and about 75 parts by weight of the composition and in which the ratio of polysilicic acid to silane ester is in the range of 1:10 to 1:1.

5. A process of coating a substrate with the composition of claim 2 which comprises contacting said substrate with the coating composition and then curing the coating at a temperature of between 100° C. and 180° C.

6. The process of claim 5 in which the curing takes place at a temperature in the range of 140° C. to 170° C. and for a time of about 20 minutes to 60 minutes.

7. The process of claim 6 in which the substrate is polymethyl methacrylate.

8. The polymethyl methacrylate substrate coated by the process of claim 7.

References Cited

UNITED STATES PATENTS

| | | | |
|---|---|---|---|
| 2,441,422 | 5/1948 | Krieble et al. | 260—29.2 |
| 2,881,146 | 4/1959 | Remer et al. | 260—29.2 |
| 3,046,242 | 7/1962 | Santelli | 260—29.2 |
| 3,076,773 | 2/1963 | Foster et al. | 260—29.2 |
| 3,310,417 | 3/1967 | Lerner et al. | 260—29.2 |
| 3,429,845 | 2/1969 | Bechtold et al. | 117—138.8 |
| 3,429,846 | 2/1969 | Bechtold et al. | 117—138.8 |
| 3,476,827 | 11/1969 | Engelhardt | 260—825 |

DONALD J. ARNOLD, Primary Examiner

A. H. KOECKERT, Assistant Examiner

U.S. Cl. X.R.

117—138.8, 161; 260—29.6, 41, 46.5, 825